(12) United States Patent
McGlothen et al.

(10) Patent No.: US 8,936,101 B2
(45) Date of Patent: Jan. 20, 2015

(54) INTERVENTIONLESS SET PACKER AND SETTING METHOD FOR SAME

(75) Inventors: Jody Ray McGlothen, Waxahachie, TX (US); Michael D. Ezell, Carrollton, TX (US); Roderick Brand Falconer, Plano, TX (US); James W. Scott, Highland Village, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 717 days.

(21) Appl. No.: 13/168,655

(22) Filed: Jun. 24, 2011

(65) Prior Publication Data

US 2012/0160521 A1    Jun. 28, 2012

Related U.S. Application Data

(63) Continuation-in-part of application No. 12/174,793, filed on Jul. 17, 2008, now Pat. No. 7,967,077.

(51) Int. Cl.

| | | |
|---|---|---|
| *E21B 23/06* | (2006.01) | |
| *E21B 33/12* | (2006.01) | |
| *H04N 21/435* | (2011.01) | |
| *H04N 21/488* | (2011.01) | |
| *E21B 33/1295* | (2006.01) | |
| *H04N 21/478* | (2011.01) | |
| *E21B 33/128* | (2006.01) | |

(52) U.S. Cl.
CPC ........... *H04N 21/488* (2013.01); *H04N 21/435* (2013.01); *E21B 33/1295* (2013.01); *H04N 21/478* (2013.01); *E21B 33/1285* (2013.01)
USPC .......................................... 166/387; 166/120

(58) Field of Classification Search
USPC .......................................... 166/134, 120, 387
See application file for complete search history.

(56) References Cited

U.S. PATENT DOCUMENTS

| | | | | |
|---|---|---|---|---|
| 2,970,649 | A | * | 2/1961 | Brown .......................... 166/121 |
| 3,112,796 | A | | 12/1963 | Myers |
| 3,180,419 | A | | 4/1965 | Cochran et al. |
| 3,189,095 | A | | 6/1965 | De Rochemont |
| 3,252,516 | A | | 5/1966 | Leutwyler |

(Continued)

FOREIGN PATENT DOCUMENTS

| | | |
|---|---|---|
| WO | 7901087 | 12/1979 |
| WO | 2007008481 | 1/2007 |

OTHER PUBLICATIONS

ISRWO, International Searching Authority, KIPO, PCT/US2012/033727, Nov. 16, 2012.

*Primary Examiner* — Catherine Loikith
(74) *Attorney, Agent, or Firm* — Lawrence R. Youst

(57) ABSTRACT

A packer (80) for establishing sealing engagement with a surface disposed in a wellbore includes a packer mandrel (90) and a seal assembly (100, 102, 104) slidably disposed about the packer mandrel (90). The seal assembly (100, 102, 104) has a running position and a radially expanded sealing position. A piston (122) is slidably disposed about the packer mandrel (90) and operably associated with the seal assembly (100, 102, 104). A release assembly 145 is disposed about the packer mandrel (90) and is releasably coupled to the piston (122) such that actuation of the release assembly (145) decouples the release assembly (145) from the piston (122) allowing the piston (122) to shift longitudinally relative to the packer mandrel (90) to operate the seal assembly (100, 102, 104) from the running position to the radially expanded sealing position, thereby setting the packer (80).

20 Claims, 10 Drawing Sheets

(56) References Cited

U.S. PATENT DOCUMENTS

| | | | |
|---|---|---|---|
| 3,422,901 A * | 1/1969 | Conrad | 166/134 |
| 4,262,702 A | 4/1981 | Streich | |
| 4,393,929 A | 7/1983 | Akkerman | |
| 4,423,777 A | 1/1984 | Mullins et al. | |
| 4,438,811 A * | 3/1984 | Patel | 166/123 |
| 4,487,258 A | 12/1984 | Jackson et al. | |
| 4,516,634 A | 5/1985 | Pitts | |
| 4,537,251 A | 8/1985 | Braddick | |
| 4,832,129 A | 5/1989 | Sproul et al. | |
| 5,058,673 A | 10/1991 | Muller et al. | |
| 5,103,901 A | 4/1992 | Greenlee | |
| 5,320,183 A | 6/1994 | Muller et al. | |
| 5,810,082 A | 9/1998 | Jordan, Jr. | |
| 5,988,287 A | 11/1999 | Jordan et al. | |
| 6,161,622 A | 12/2000 | Robb et al. | |
| 6,431,276 B1 | 8/2002 | Robb et al. | |
| 6,622,789 B1 | 9/2003 | Braddick | |
| 6,719,063 B2 | 4/2004 | Adams et al. | |
| 6,763,893 B2 | 7/2004 | Braddick | |
| 6,779,600 B2 | 8/2004 | King et al. | |
| 6,814,143 B2 | 11/2004 | Braddick | |
| 7,073,599 B2 | 7/2006 | Smith | |
| 7,124,827 B2 | 10/2006 | Braddick | |
| 7,124,829 B2 | 10/2006 | Braddick | |
| 7,225,880 B2 | 6/2007 | Braddick | |
| 7,231,987 B2 | 6/2007 | Kilgore et al. | |
| 7,278,492 B2 | 10/2007 | Braddick | |
| 7,967,077 B2 | 6/2011 | Ezell et al. | |
| 2007/0246227 A1 | 10/2007 | Ezell et al. | |
| 2008/0135255 A1 | 6/2008 | Coronado et al. | |
| 2008/0135261 A1 * | 6/2008 | McGilvray et al. | 166/382 |
| 2010/0012330 A1 | 1/2010 | Ezell et al. | |

* cited by examiner

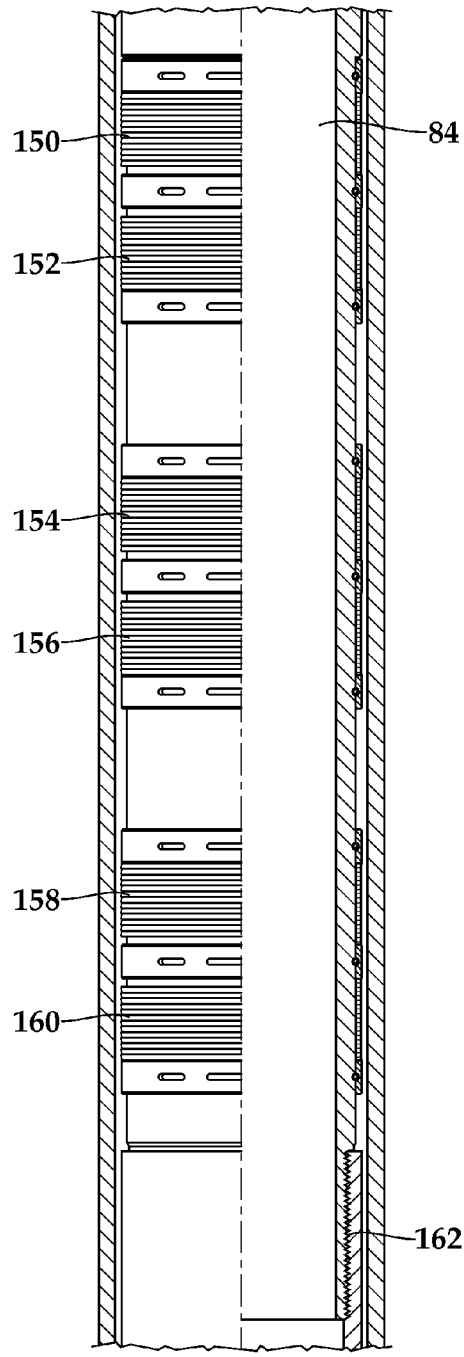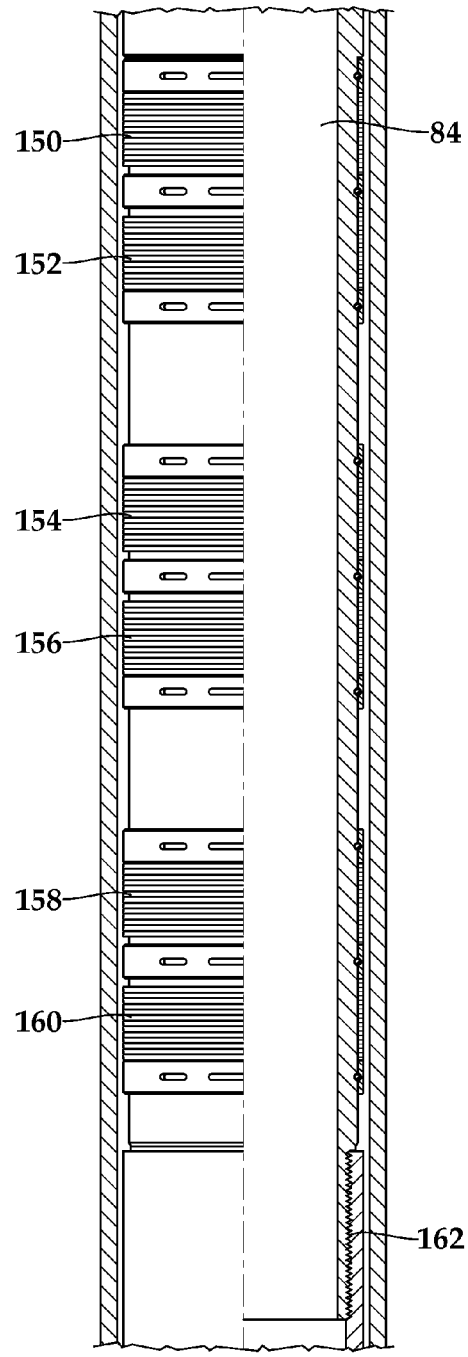
*Fig.2C*          *Fig.3C*

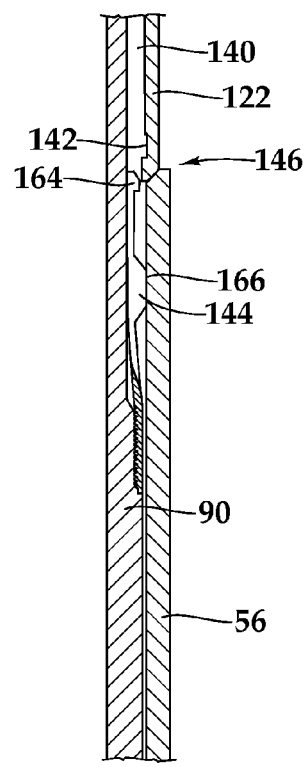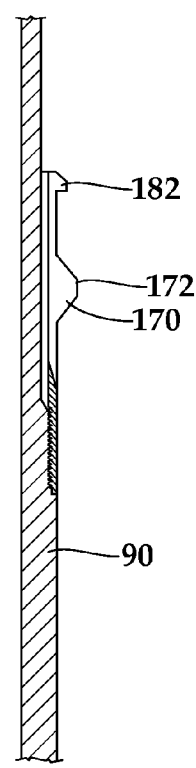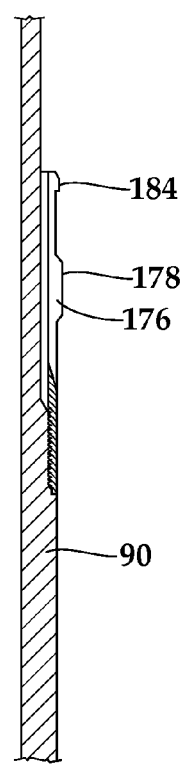
Fig.4  Fig.5  Fig.6
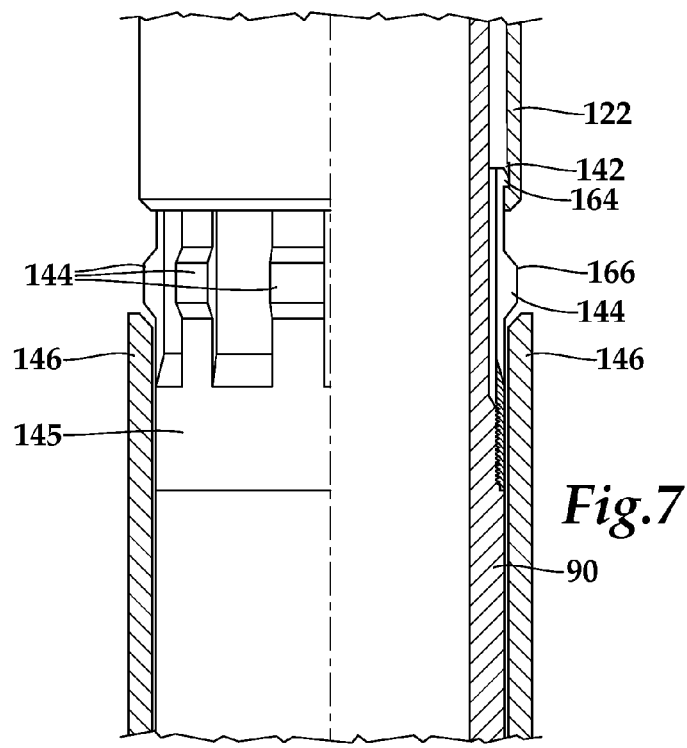
Fig.7

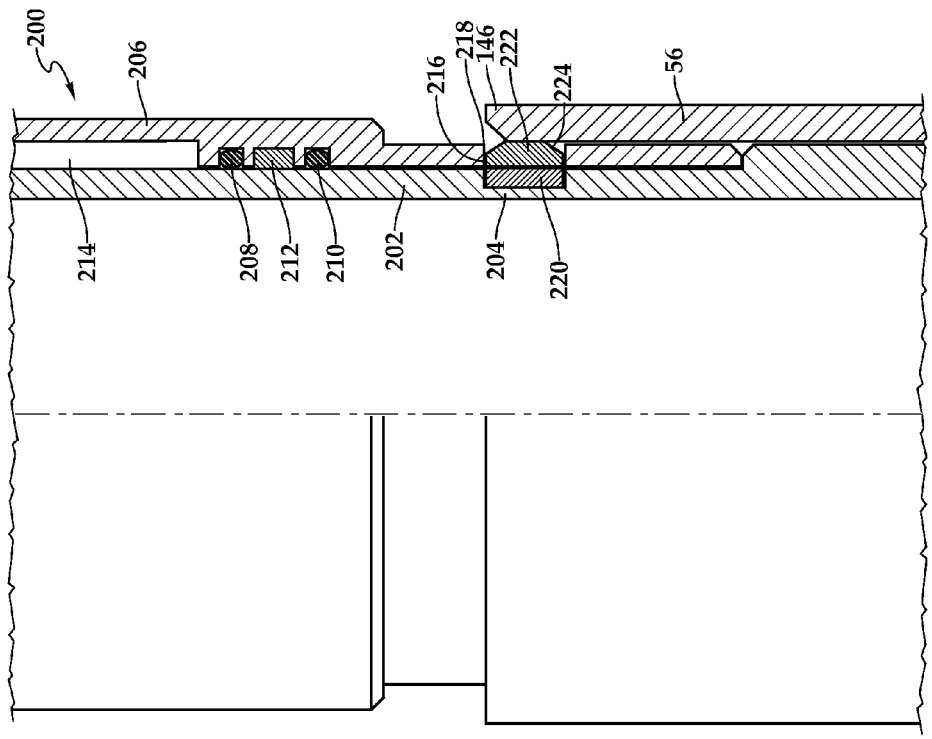
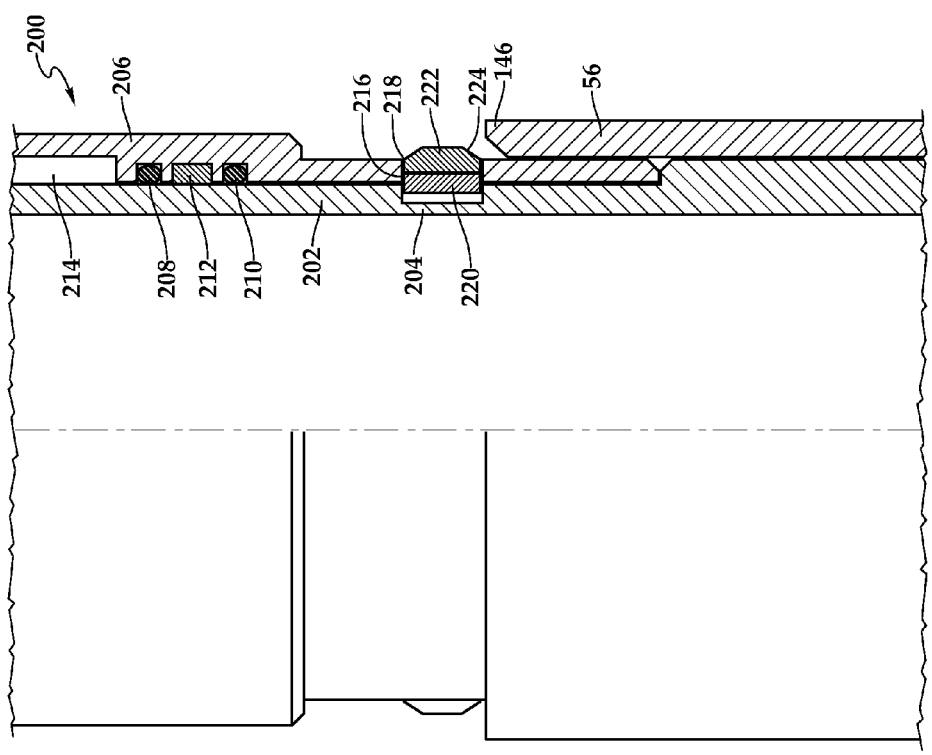

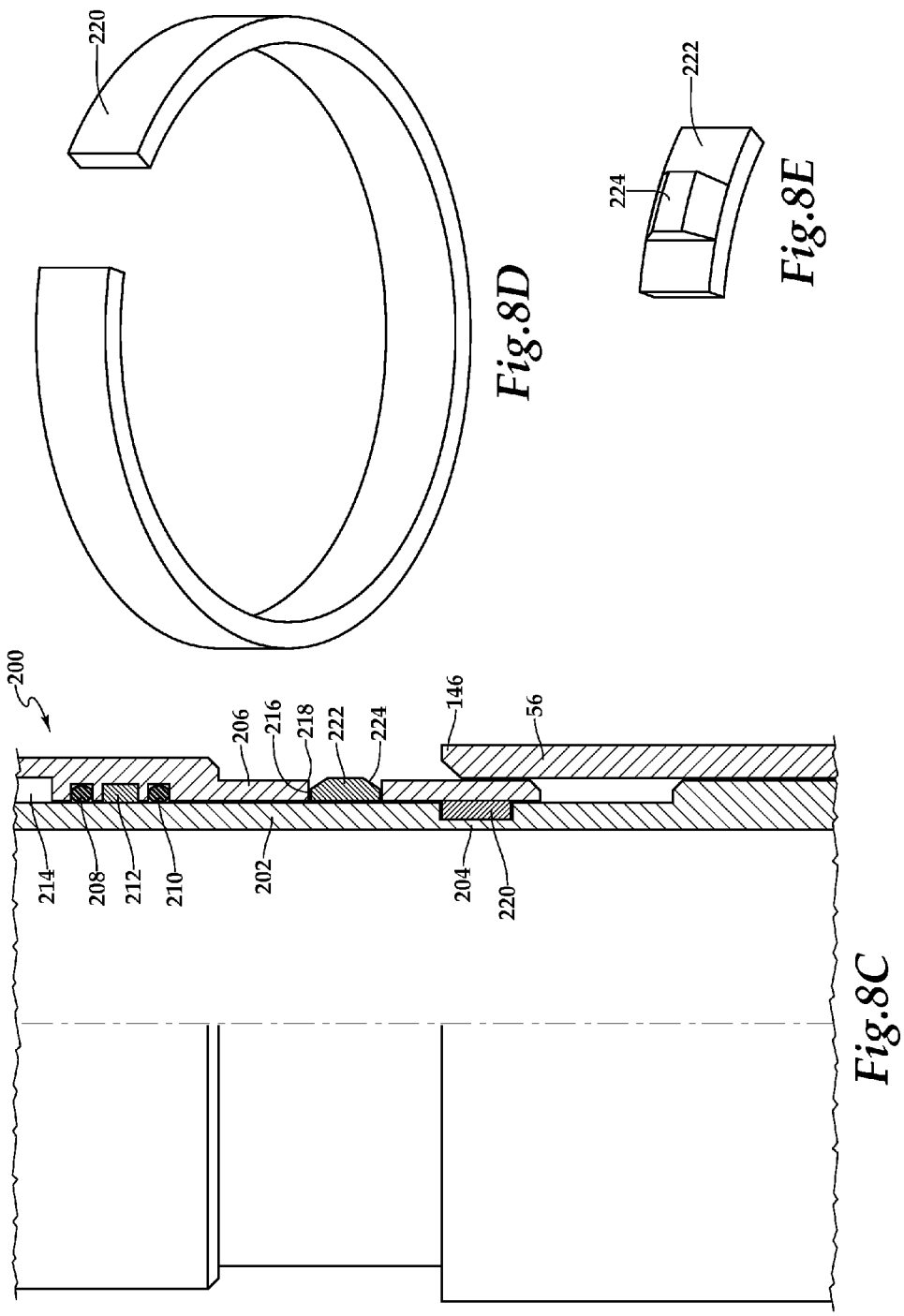

INTERVENTIONLESS SET PACKER AND SETTING METHOD FOR SAME

CROSS-REFERENCE TO RELATED APPLICATIONS

The present application is a continuation in part of application Ser. No. 12/174,793, filed Jul. 17, 2008, now U.S. Pat. No. 7,967,077 issued Jun. 28, 2011, the entire disclosure of which is incorporated herein by this reference.

TECHNICAL FIELD OF THE INVENTION

This invention relates, in general, to packer setting mechanisms used in a wellbore that traverses a subterranean hydrocarbon bearing formation and, in particular, to an interventionless set packer and method for setting same.

BACKGROUND OF THE INVENTION

Without limiting the scope of the present invention, its background will be described in relation to setting packers, as an example.

In the course of treating and preparing a subterranean well for production, well packers are commonly run into the well on a conveyance such as a work string or production tubing. The purpose of the packer is to support production tubing and other completion equipment, such as sand control assemblies adjacent to a producing formation, and to seal the annulus between the outside of the production tubing and the inside of the well casing to block movement of fluids through the annulus past the packer location.

Production packers and other types of downhole tools may be run down on production tubing to a desired depth in the wellbore before they are set. Certain conventional production packers are set hydraulically, requiring that a pressure differential be created across a setting piston. Typically, this is accomplished by running a tubing plug on wireline, slick line, electric line, coiled tubing or another conveyance means through the production tubing down into the downhole tool. Then the fluid pressure within the production tubing is increased, thereby creating a pressure differential between the fluid within the production tubing and the fluid within the wellbore annulus. This pressure differential actuates the setting piston to expand the production packer into sealing engagement with the production liner or casing. Before resuming normal operations through the production tubing, the tubing plug must be removed, typically by retrieving the plug back to the surface of the well.

As operators increasingly pursue production completions in deeper water offshore wells, highly deviated wells and extended reach wells, the rig time required to set a tubing plug and thereafter retrieve the plug can negatively impact the economics of the project, as well as add unacceptable complications and risks. To address the issues associated with hydraulically-set downhole tools, an interventionless setting technique was developed. In particular, a hydrostatically-actuated setting module was designed to be incorporated into the bottom end of a downhole tool, and this module exerts an upward setting force on the downhole tool. The hydrostatic setting module may be actuated by applying pressure to the production tubing and the wellbore at the surface, with the setting force being generated by a combination of the applied surface pressure and the hydrostatic pressure associated with the fluid column in the wellbore. In particular, a piston of the hydrostatic setting module is exposed on one side to a vacuum evacuated initiation chamber that is initially closed off to wellbore annulus fluid by a port isolation device, and the piston is exposed on the other side to an enclosed evacuated chamber generated by pulling a vacuum.

In operation, once the downhole tool is positioned at the required setting depth, surface pressure is applied to the production tubing and the wellbore annulus until the port isolation device actuates, thereby allowing wellbore fluid to enter the initiation chamber on the one side of the piston while the chamber engaging the other side of the piston remains at the evacuated pressure. This creates a differential pressure across the piston that causes the piston to move, beginning the setting process. Once the setting process begins, O-rings in the initiation chamber move off seat to open a larger flow area, and the fluid entering the initiation chamber continues actuating the piston to complete the setting process. Therefore, the bottom-up hydrostatic setting module provides an interventionless method for setting downhole tools since the setting force is provided by available hydrostatic pressure and applied surface pressure without plugs or other well intervention devices.

However, the bottom-up hydrostatic setting module may not be ideal for applications where the wellbore annulus and production tubing cannot be pressured up simultaneously. Such applications include, for example, when a packer is used to provide liner top isolation or when a packer is landed inside an adjacent packer in a stacked packer completion. The production tubing cannot be pressured up in either of these applications because the tubing extends as one continuous conduit out to the pay zone where no pressure, or limited pressure, can be applied.

In such circumstances, if a bottom-up hydrostatic setting module is used to set a packer above another sealing device, such as a liner hanger or another packer, for example, there is only a limited annular area between the unset packer and the set sealing device below. Therefore, when the operator pressures up on the wellbore annulus, the hydrostatic pressure begins actuating the bottom-up hydrostatic setting module to exert an upward setting force on the packer. However, when the packer sealing elements start to engage the casing, the limited annular area between the packer and the lower sealing device becomes closed off and can no longer communicate with the upper annular area that is being pressurized from the surface. Thus, the trapped pressure in the limited annular area between the packer and the lower sealing device is soon dissipated and may or may not fully set the packer.

Therefore, a need has arisen for a packer that is operable to be set without tripping a plug into the wellbore. A need has also arisen for a packer that is operable to be set without the application of tubing pressure from the surface. Further, a need has arisen for a packer that is operable to be set without the application of annular pressure from the surface.

SUMMARY OF THE INVENTION

The present invention disclosed herein comprises an interventionless set packer that is operable to be set without tripping a plug into the wellbore. In addition, the interventionless set packer of the present invention is operable to be set without the application of tubing pressure from the surface. Further, the interventionless set packer of the present invention is operable to be set without the application of annular pressure from the surface.

In one aspect, the present invention is directed to a method for setting a packer in a wellbore. The method includes providing a packer having a packer mandrel with a seal assembly and a piston slidably disposed thereabout; running the packer into the wellbore; resisting a force acting on the piston that generated by a pressure difference between pressure in the wellbore and pressure in a chamber defined between the piston and the packer mandrel by restraining movement of the piston toward the seal assembly with a release assembly; actuating the release assembly with a profile in the wellbore; and responsive to the pressure difference, longitudinally shifting the piston relative to the packer mandrel toward the seal assembly, to operate the seal assembly from a running position to a radially expanded sealing position, thereby setting the packer.

In certain embodiments, the method may also include decoupling a collet assembly from the piston, disengaging a split ring from the piston, decoupling a collet assembly from a sleeve slidably disposed about the packer mandrel, shifting the sleeve toward the piston and breaking a frangible member coupling the piston and the packer mandrel or engaging a time delay assembly of the packer with the profile in the wellbore prior to actuating the release assembly.

In another aspect, the present invention is directed to a method for setting a packer in a wellbore. The method includes providing a packer having a packer mandrel with a seal assembly, a slip assembly and a piston slidably disposed thereabout; running the packer into the wellbore; resisting a force acting on the piston that generated by a pressure difference between pressure in the wellbore and pressure in a chamber defined between the piston and the packer mandrel by restraining movement of the piston toward the seal assembly with a release assembly; actuating the release assembly with a profile in the wellbore; and responsive to the pressure difference, longitudinally shifting the piston relative to the packer mandrel toward the seal assembly, to operate the seal assembly from a running position to a radially expanded sealing position and to operate the slip assembly from the running position to the radially expanded gripping position, thereby setting the packer.

In a further aspect, the present invention is directed to a packer for use in a wellbore. The packer includes a packer mandrel with a seal assembly slidably disposed thereabout. A piston is slidably disposed about the packer mandrel and defines a chamber therewith. A release assembly is disposed about the packer mandrel and is releasably coupled to the piston. The release assembly initially restrains movement of the piston toward the seal assembly resisting a force generated by a pressure difference between pressure in the wellbore and pressure in the chamber until actuation of the release assembly allows the pressure difference to shift the piston longitudinally relative to the packer mandrel toward the seal assembly to operate the seal assembly from a running position to a radially expanded sealing position, thereby setting the packer.

In one embodiment, the release assembly may include a collect assembly that is disposed about the packer mandrel. In another embodiment, the release assembly may include a split ring disposed about the packer mandrel and at least on release key positioned at least partially between the split ring and the piston. In a further embodiment, the release assembly may include a collect assembly disposed about the packer mandrel, a sleeve slidably disposed about the packer mandrel and a frangible member coupling the piston and the packer mandrel. With any of these embodiments, the packer may include a time delay assembly disposed about the packer mandrel that is operable to prevent premature actuation of the release assembly.

In yet another aspect, the present invention is directed to a packer for use in a wellbore. The packer includes a packer mandrel with a seal assembly and a slip assembly slidably disposed thereabout. A piston is slidably disposed about the packer mandrel and defines a chamber therewith. A release assembly is disposed about the packer mandrel and is releasably coupled to the piston. The release assembly initially restrains movement of the piston toward the seal assembly and the slip assembly resisting a force generated by a pressure difference between pressure in the wellbore and pressure in the chamber until actuation of the release assembly allows the pressure difference to shift the piston longitudinally relative to the packer mandrel toward the seal assembly and the slip assembly to operate the seal assembly from a running position to a radially expanded sealing position and to operate the slip assembly from a running position to a radially expanded gripping position, thereby setting the packer.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIGS. 2A-2C are quarter-sectional views of an interventionless set packer in accordance with the present invention in its running configuration;

FIGS. 3A-3C are quarter-sectional views of an interventionless set packer in accordance with the present invention in its set configuration;

FIG. 4 is a cross sectional view a release assembly depicting a collet finger of an interventionless set packer in accordance with an embodiment of the present invention;

FIG. 5 is a cross sectional view a release assembly depicting a collet finger of an interventionless set packer in accordance with an embodiment of the present invention;

FIG. 6 is a cross sectional view a release assembly depicting a collet finger of an interventionless set packer in accordance with an embodiment of the present invention;

FIG. 7 is a quarter-sectional view of a release assembly of an interventionless set packer in accordance with the present invention;

FIGS. 8A-8C are quarter-sectional views of a release assembly of an interventionless set packer in accordance with the present invention in its various operating configurations;

FIG. 8D is a isometric view of a split ring of a release assembly of an interventionless set packer in accordance with the present invention;

FIG. 8E is an isometric view of a release key of a release assembly of an interventionless set packer in accordance with the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
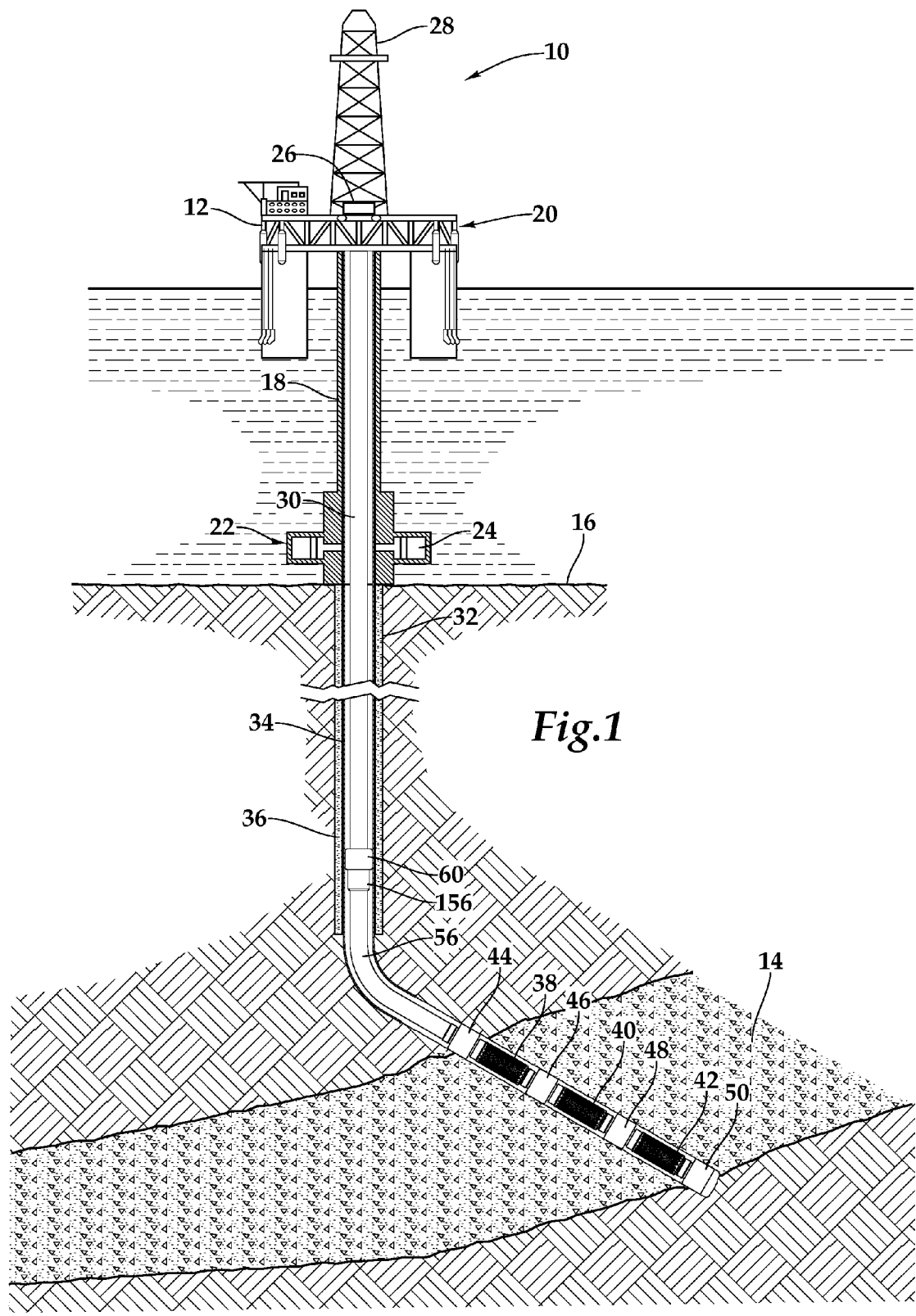
FIG. 1 is a schematic illustration of an offshore platform operating an interventionless set packer in accordance with the present invention.

Referring initially to FIG. 1, several interventionless set packers in a completion string deployed in an offshore oil or gas well are schematically illustrated and generally designated 10. A semi-submersible platform 12 is centered over a submerged oil and gas formation 14 located below sea floor 16. A subsea conduit 18 extends from deck 20 of platform 12 to wellhead installation 22, including blowout preventers 24. Platform 12 has a hoisting apparatus 26 and a derrick 28 for raising and lowering pipe strings, such as substantially tubular, longitudinally extending inner work string 30.

Importantly, even though FIG. 1 depicts a slanted well, it should be understood by one skilled in the art that the interventionless set packers of the present invention are equally well-suited for use in vertical wells, horizontal wells, multilateral wells and the like. Also, even though FIG. 1 depicts an offshore operation, it should be understood by one skilled in the art that the interventionless set packers of the present invention are equally well-suited for use in onshore operations.

Continuing with FIG. 1, a wellbore 32 extends through the various earth strata including formation 14. A casing 34 is cemented within a vertical section of wellbore 32 by cement 36. An upper end of a liner 56 is secured to the lower end of casing 34 by any means commonly known, such as expandable liner hangers, and the like.

Note that, in this specification, the terms "liner" and "casing" are used interchangeably to describe tubular materials, which are used to form protective linings in wellbores. Liners and casings may be made from any material such as metals, plastics, composites, or the like, may be expanded or unexpanded as part of an installation procedure, and may be segmented or continuous. Additionally, it is not necessary for a liner or casing to be cemented in a wellbore. Any type of liner or casing may be used in keeping with the principles of the present invention.

Liner 56 may include one or more packers 44, 46, 48, 50, 60 that may be located proximal to the top of liner 56 or at lower portion of liner 56 that provide zonal isolation to the production of hydrocarbons to certain zones of liner 56. Packers 44, 46, 48, 50, 60 include and are actuated by the interventionless set packer setting mechanism of the present invention. When set, packers 44, 46, 48, 50, 60 isolate zones of the annulus between wellbore 32 and liner 56. In this manner, formation fluids from formation 14 may enter the annulus between wellbore 32 and casing 34 in between packers 44, 46, between packers 46, 48, and between packers 48, 50.

In addition, liner 56 includes sand control screen assemblies 38, 40, 42 that are located near the lower end of liner 56 and substantially proximal to formation 14. As shown, packers 44, 46, 48, 50 may be located above and below each set of sand control screen assemblies 38, 40, 42.

Referring now to FIGS. 2A-2C and 3A-3C, detailed quarter-sectional views of successive axial portions of interventionless set packer 80 having an interventionless set packer setting mechanism are representatively illustrated. A lower mandrel 82 of liner 56 is coupled to packer 80 at an upper threaded connection 86, and additional sections of liner 56 may be coupled at a lower threaded connection 162 when the overall assembly is conveyed into wellbore 32. Mandrel 82 includes an inner central passageway 84 that extends through mandrel 82 and packer 80.

A wedge 88 is disposed about a packer mandrel 90 and mandrel 82 and is coupled to mandrel 82 at upper threaded connection 86. Wedge 88 has a camming outer surface that will engage an inner surface of a slip assembly 92. As should be apparent to those skilled in the art, wedge 88 may have a variety of configurations including configurations having other numbers of wedge sections, such configurations being considered within the scope of the present invention.

Slip assembly 92 is located between wedge 88 and a wedge 94. In one embodiment, slip assembly 92 may have teeth 93 located along its outer surface for providing a gripping arrangement with the interior of the well casing. As explained in greater detail below, when a compressive force is generated between wedge 88, slip assembly 92, and wedge 94, slip assembly 92 is radially expanded into contact with the well casing.

Initially, relative movement between wedge 94 and slip assembly 92 is opposed by shear screw 96 attached to packer mandrel 90. As discussed further below, shearing of shear screw 96 enables wedge 94 to move relative to slip assembly 92.

Substantially adjacent to wedge 94 is an upper element backup shoe 98 that is slidably positioned around packer mandrel 90. Additionally, a seal assembly, depicted as expandable seal elements 100, 102, 104, is slidably positioned around packer mandrel 90 between upper element backup shoe 98 and a lower element backup shoe 106. In the illustrated embodiment, three expandable seal elements 100, 102, 104 are shown; however, a seal assembly of the packer of the present invention may include any number of expandable seal elements.

Upper element backup shoe 98 and lower element backup shoe 106 may be made from a deformable or malleable material, such as mild steel, soft steel, brass, and the like and may be thin cut at their distal ends. The ends of upper element backup shoe 98 and lower element backup shoe 106 will deform and flare outwardly toward the inner surface of the casing or formation during the setting sequence as further described below. In one embodiment, upper element backup shoe 98 and lower element backup shoe 106 form a metal-to-metal barrier between packer 80 and the inner surface of the casing.

Another wedge 110 is disposed about packer mandrel 90. Wedge 110 has a camming outer surface that will engage an inner surface of a slip assembly 112. As should be apparent to those skilled in the art, wedge 110 may have a variety of configurations including configurations having other numbers of wedge sections, such configurations being considered within the scope of the present invention.

Initially, relative movement between wedge 110 and lower element backup shoe 106 is opposed by shear screw 108 attached packer mandrel 90. As discussed further below, shearing of shear screw 108 enables wedge 110 to move lower element backup shoe 106 in an upwardly direction.

Slip assembly 112 is located between wedge 110 and a wedge 116. In one embodiment, slip assembly 112 may have teeth 113 located along its outer surface for providing a gripping arrangement with the interior of the well casing. As explained in greater detail below, when a compressive force is generated between wedge 110, slip assembly 112, and wedge 116, slip assembly 112 is radially expanded into contact with the well casing.

Initially, relative movement between wedge 116 and slip assembly 112 is opposed by shear screw 114 attached to packer mandrel 90. As discussed further below, shearing of shear screw 114 enables wedge 116 to move relative to wedge 110.

Packer mandrel 90, wedge 116, and a piston 122 form a cavity 118 for a hydraulically-actuated, top-down contingency access located internally of packer mandrel 90. The inner surface of packer mandrel 90 may be configured to receive a punch-to-set tool (not shown) operable to punch a hole through the wall of the packer mandrel 90 in the vicinity of cavity 118 in the event additional or contingency pressure is required to operate packer mandrel 90. The term "punch-to-set tool" may identify any device operable to perforate the packer mandrel 90, including but not limited to chemical, mechanical and pyrotechnic perforating devices. The punch-to-set tool also acts as a tubing plug within the packer mandrel 90 as will be more fully described below. In another embodiment, the packer mandrel 90 includes a pre-punched port through the mandrel wall in the vicinity of cavity 118, but this embodiment provides somewhat less control over the possible inadvertent setting expandable seal elements 100, 102, 104.

A piston 122 is slidably disposed about packer mandrel 90 and coupled to wedge 116 through a threaded connection 120. Piston 122 extends between wedge 116 and a release assembly depicted as collet assembly 145 having one or more collet fingers 144. One or more seals 124, 128 and centralizer ring 126 are located between packer mandrel 90 and the upper portion of piston 122 to provide a sealing relationship between packer mandrel 90 and piston 122. Additionally, one or more seals 134, 138 and centralizer ring 136 are located between packer mandrel 90 and the lower portion of piston 122 to provide a sealing relationship between packer mandrel 90 and piston 122. Centralizer rings 126, 136 are operable to properly position piston 122 about the packer mandrel 90 and form a uniformly shaped atmospheric chamber 130.

Seals 124, 128, 134, 138 may consist of any suitable sealing element or elements, such as a single O-ring, a plurality of O-rings, as illustrated, and/or a combination of backup rings, O-rings, and the like. In various embodiments, Seals 124, 128, 134, 138 and/or centralizer rings 126, 136 comprise AFLAS® O-rings with PEEK back-ups for severe downhole environments, Viton O-rings for low temperature service, Nitrile or Hydrogenated Nitrile O-rings for high pressure and temperature service, or a combination thereof.

Atmospheric chamber 130 comprises an elongate cavity formed between packer mandrel 90 and piston 122, and it is initially evacuated by pulling a vacuum. The vacuum in atmospheric chamber 130 acts against hydrostatic piston 122. Seals 124, 128, 134, 138 are provided between packer mandrel 90 and piston 122 to seal off atmospheric chamber 130.

In addition, piston 122, packer mandrel 90, and collet assembly 145 define a chamber 140 that facilitates the operation between collet fingers 144 and piston 122. A detent 142 is formed on the inner surface of piston 122 near the lower end of cavity chamber 140 for releasably accepting a tab 164 of collet fingers 144, as best seen in FIGS. 4 and 7. Collet fingers 144 are designed to engage with a protrusion or profile, such as the top of liner 56 or a protrusion or profile formed in an inner surface of liner 56, casing, or wellbore 32, for example. Packer 80 may further include a series of seals 150, 152, 154, 156, 158, 160 for providing additional sealing engagement between packer 80 and liner 56, casing, or wellbore 32.

Figures 2A, 3A:
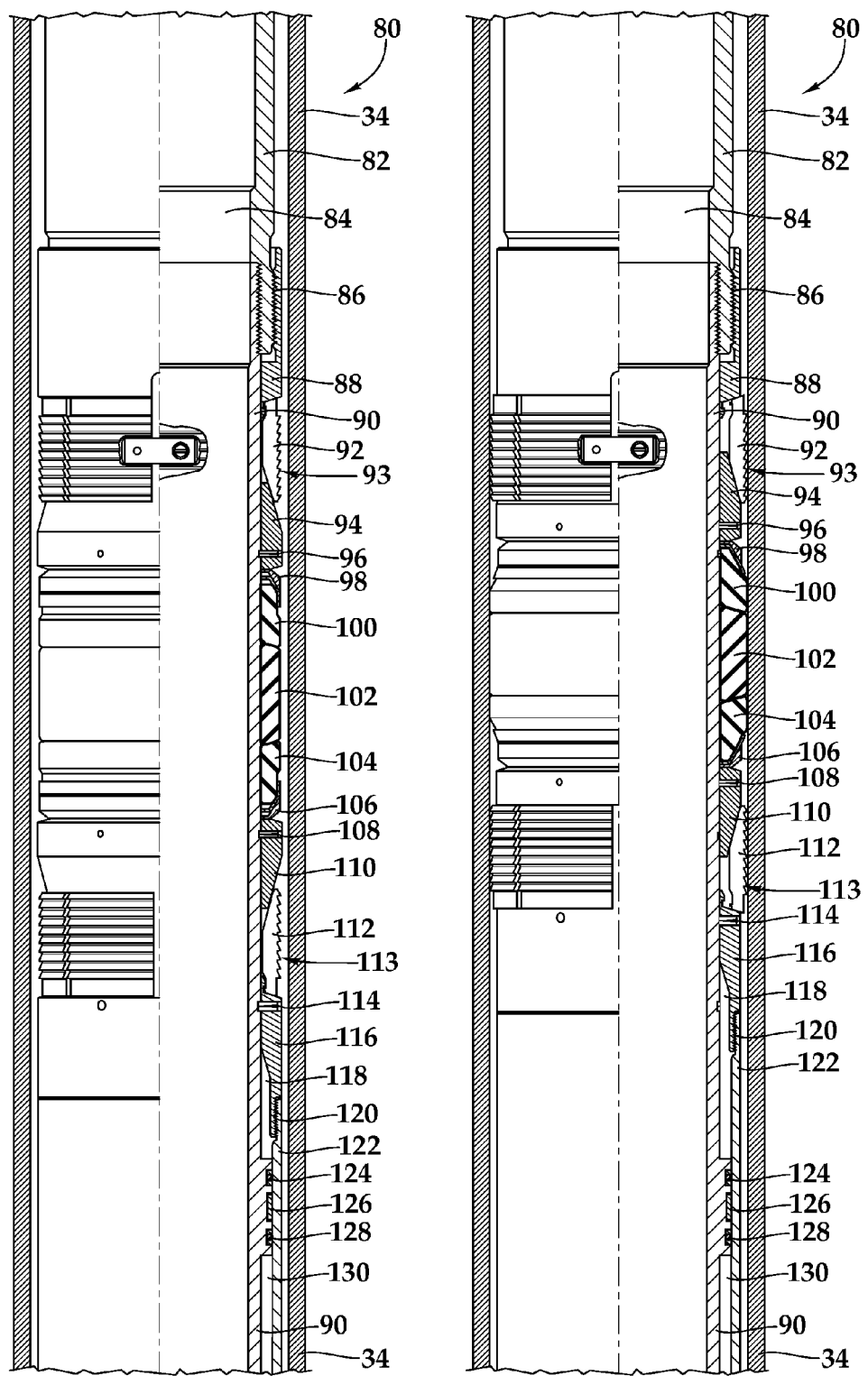
Figures 2B, 3B:
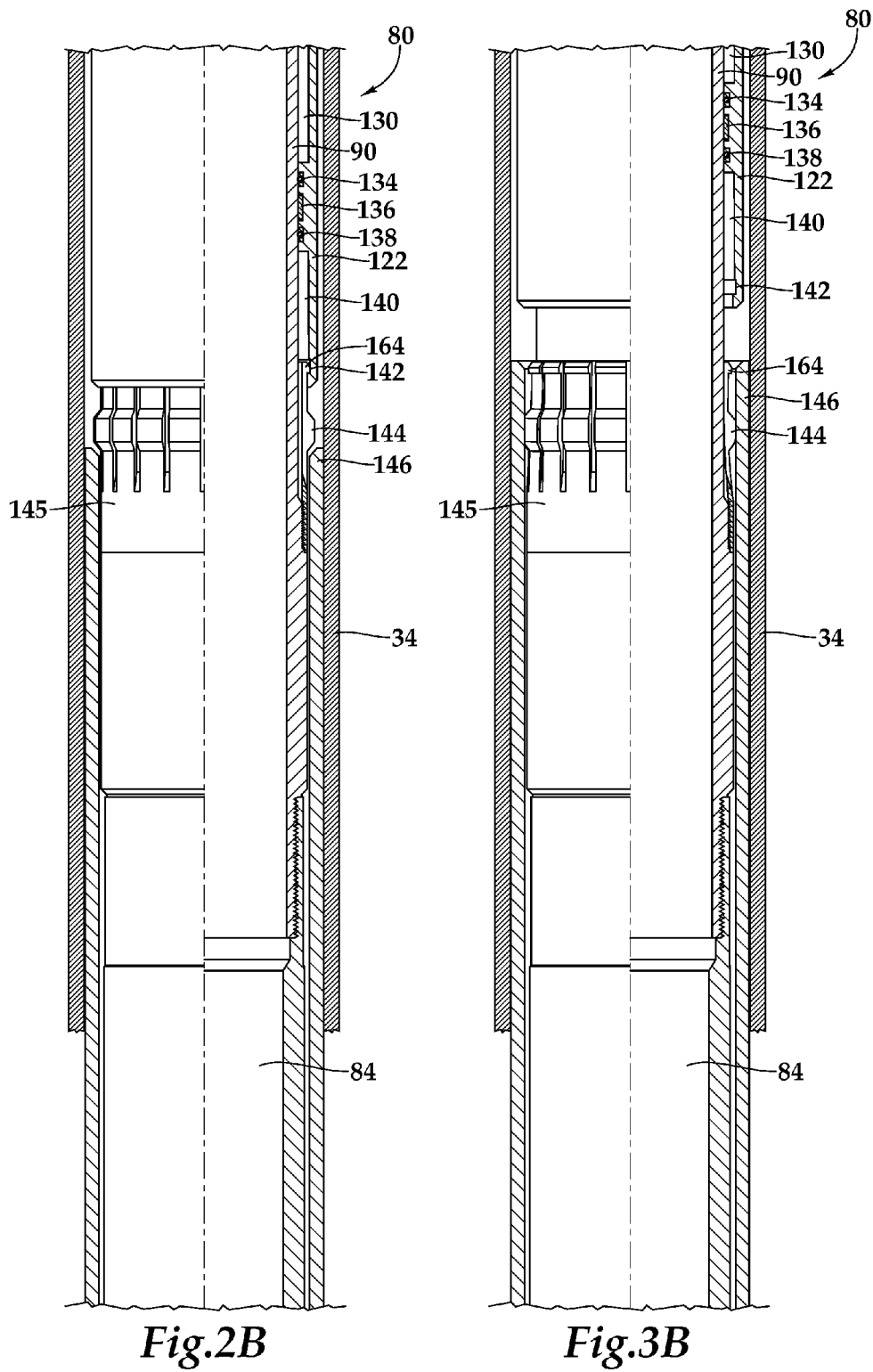

Referring now to FIG. 4, detent 142 can be seen formed in the inner surface or wall of piston 122. This figure illustrates a collet finger 144 having a protrusion 166 being engaged with a liner top 146 of liner 56 or other protrusion or profile, such as a casing or wellbore 32. Although one collet finger 144 is shown with respect to FIG. 4, packer 80 may include numerous collet fingers 144, as best seen in FIGS. 2b, 3b, and 7. Collet finger 144 includes a protrusion 166 for engaging a surface of a liner top 146, casing, or wellbore 32. Protrusion 166 may be generally located anywhere on collet finger 144 such that it forces tab 164 inwardly as collet finger 144 contacts liner top 146.

Detent 142 may be formed in the inner surface or wall of piston 122 such that it provides a unique profile or shape for engaging a particular tab 164 of collet finger 144. Detent 142 has a depth that provides releasable engagement with tab 164 of collet finger 144 such that when protrusion 166 engages liner top 146, collet finger 144 will move inwardly toward packer mandrel 90 thereby moving or collapsing tab 164 inwardly and disengaging with detent 142, thus enabling piston 122 to slide upward as described further below, and as best seen in FIGS. 3A-3B.

Referring now to FIG. 5, a collet finger 170 is shown having a larger profile protrusion 172 for engaging liner top 146, casing or wellbore 32. The profile of protrusion 172 facilitates engagement of liner top 146, casing, or wellbore 32 that may be located a greater distance away from collet finger 170. In addition, tab 182 is larger than that shown in FIG. 4 to enable engagement with a deeper detent 142.

Referring to FIG. 6, a collet finger 176 is shown having a smaller profile protrusion 178 for engaging liner top 146, casing, or wellbore 32. The profile of protrusion 178 facilitates engagement of liner top 146, casing, or wellbore 32 that may be located a smaller distance away from collect finger 176. In addition, tab 184 may also be similarly smaller than that shown in FIG. 4 to enable engagement with a shallower detent 142.

Referring back to FIG. 1, packers 44, 46, 48, 50 are shown located below liner top 146 of liner 56 for engaging with a tab, profile, or protrusion located proximal to their respective locations downhole in wellbore 32. In this manner, one or more packers 44, 46, 48, 50, 60 may be set concurrently as inner work string 30 is lowered into position downhole. In one embodiment, collet fingers 144, 170, 176 may have different profiles of protrusion 166, 172, 178 such that the collet fingers 144 of the lowest position packer, such as those relating to packer 50 do not engage liner top 146, casing, or wellbore 32 until it is near its engagement position downhole. Although, five packers 44, 46, 48, 50, 60 are shown, any number of packers may be used. For example, packer 50 may have collet fingers with a particular protrusion and tab size or profile, such as collet finger 176, while packer 60 may have collet fingers, such as collet finger 170 with a larger protrusion and tab size or profile.

Referring to FIG. 7, collet assembly 145 of a packer 60 is depicted having fewer collet fingers 144 than that shown in FIGS. 2B and 3B. Any of packers 44, 46, 48, 50, 60 may have the same or a different number of collet fingers 144. As described above, any number of collet fingers 144 may be used on packer 80. In addition, collet fingers 144 may be oriented or spaced radially apart so as to form a selective pattern for engaging a similarly shaped pattern or profile of the liner top 146, casing, or wellbore 32. In this embodiment, selective activation of one or more packers 80, such as packers 44, 46, 48, 50, 60, may be performed simultaneously as they each engage selectively with liner top 146, casing, or wellbore 32. The lower positioned packer 80 may slide through protrusions of liner top 146, casing, or wellbore 32 that are located above the final position of the packer 80.

Referring collectively to FIGS. 2A-2C and 3A-3C the operation of packer 80 will now be described. Packer 80 is shown before and after activation and expansion of expandable seal elements 100, 102, 104 and slip assemblies 92 and 112, respectively, in FIGS. 2A-2C and 3A-3C.

Surface profiles may be manufactured or created in wellbore 32, casing 34, liner 56, liner top 146, or other downhole surfaces that are sized to activate a particular packer 80. These surface profiles are positioned or created at locations desirable to set packer 80 prior to running packer 80 into wellbore 32. These surface profiles are slightly different than their surrounding surface profiles to enable specific engagement with protrusions 166, 172, 178.

In one instance, a surface profile may exist between liner top 146 and casing 34 as best seen in FIG. 1. The inner diameter of liner top 146 may be less than the diameter of casing 34 because it is located within casing 34. The liner top 146 of liner 56 then may be used to activate packer 80.

In operation, packer 80 of FIGS. 2A-2C may be run into wellbore 32 on inner work string 30 to a desired depth, for example, and then packer 80 may be set against casing 34, liner 56, or against wellbore 32. In one embodiment, packer 80 may be used as a liner top isolation packer, such as packer 60 as best seen in FIG. 1. In particular, once liner 56 has been deployed and suspended from casing 34, packer 80 may be run into wellbore 32 on production tubing or inner work string 30 using regular completion techniques.

As packer 80 approaches liner top 146 of liner 56, collet assembly 145 is actuated by engaging collet fingers 144 with liner top 146 causing them to contract inwardly towards packer mandrel 90, as best seen in FIG. 3B. This contraction causes tab 164 to disengage with detent 142 of piston 122. Once all of tabs 164 of packer 80 are disengaged with their respective detents 142, piston 122 moves upward due to the low pressure or vacuum in atmospheric chamber 130.

Once the shear force between piston 122 and packer mandrel 90 exceeds a predetermined amount, shear screw 114 shears allowing the upward force of piston 122 to act upon wedge 116 to move wedge 116 upward towards slip assembly 112. As wedge 116 contacts slip assembly 112, slip assembly 112 moves upwardly over wedge 110, which starts to set slip assembly 112 against the inner surface of a setting surface, such as casing 34.

As slip assembly 112 is extending outwardly toward the inner surface of casing 34, it further moves upward causing an upward force on wedge 110. Once the shear force between slip assembly 112, wedge 110 and packer mandrel 90 exceeds a predetermined amount, shear screw 108 shears allowing wedge 110 to force lower element backup shoe 106 to begin to move upward relative to packer mandrel 90. As piston 122, wedge 116, slip assembly 112, wedge 110, and lower element backup shoe 106 begin to move upward, expandable seal elements 100, 102, 104 begin to move upward and also to extend outwardly toward casing 34.

The upward movement of expandable seal elements 100, 102, 104 forces upper element backup shoe 98 and lower element backup shoe 106 to flare outward toward casing 34 to provide a metal-to-metal seal in addition to the seal of expandable seal elements 100, 102, 104 between casing 34 and packer mandrel 90, as best seen in FIGS. 3A-3C.

Upon the upward and sealingly movement of lower element backup shoe 106, expandable seal elements 100, 102, 104, and upper element backup shoe 98, an upward force is transmitted to wedge 94. Once the shear force between wedge 94 and packer mandrel 90 exceeds a predetermined amount, shear screw 96 shears allowing the upward force of wedge 94 to act upon slip assembly 92. As wedge 94 contacts slip assembly 92, slip assembly 92 moves upwardly over wedge 88 and wedge 94, which moves slip assembly 92 outwardly against the inner surface of casing 34. As shown in FIG. 1, any number of packers 80 may be simultaneously or sequentially run and deployed, such as packers 44, 46, 48, 50, 60.

Referring next to FIGS. 8A-8E, therein is depicted an alternate embodiment of a release assembly for use in an interventionless set packer of the present invention that is generally designated 200. Packer 200 includes a packer mandrel 202 that has a radially reduced outer section 204 extending circumferentially therearound. A piston 206 is positioned around packer mandrel 202. A pair of seals 208, 210 and a centralizer 212 are positioned between piston 206 and packer mandrel 202. Piston 206 and packer mandrel 202 define an atmospheric chamber 214 therebetween. Piston 206 has a radially expanded inner section 216 extending circumferentially therearound and one or more windows 218 that extend through the sidewall of piston 206.

Packer 200 has a release assembly that is depicted as a split ring 220, as best seen in FIG. 8D, and one or more release keys 222 having outer profiles 224, as best seen in FIG. 8E. The number of release keys 222 preferably corresponds to the number of windows 218 in piston 206. In its run in configuration, split ring 220 is positioned partially in radially reduced outer section 204 of packer mandrel 202 and partially in radially expanded inner section 216 of piston 206. In this configuration, split ring 220 is sized and designed to prevent relative axial movement between piston 206 and packer mandrel 202. Also, in this configuration, split ring 220 outwardly radially supports release keys 222 such that at least a portion of outer profiles 224 of release keys 222 extend radially outwardly through windows 218 of piston 206.

In operation, packer 200 may be run into wellbore 32 on inner work string 30 to a desired depth, as described above, and then packer 200 may be set within wellbore 32. In one embodiment, packer 200 may be used as a liner top isolation packer, such as packer 60 of FIG. 1. In particular, once liner 56 has been deployed and suspended from casing 34, packer 200 may be run into wellbore 32 using regular completion techniques.

As packer 200 enters liner top 146 of liner 56, the release assembly is actuated by engaging outer profiles 224 of release keys 222 with liner top 146 causing them to contract inwardly towards packer mandrel 202 which radially inwardly biases split ring 220 into radially reduced outer section 204 of packer mandrel 202, as best seen in FIG. 8B. In this configuration, split ring 220 no longer interferes with radially expanded inner section 216 of piston 206 thus split ring 220 no longer prevents relative axial movement between piston 206 and packer mandrel 202. Once in this configuration, the hydrostatic pressure in wellbore 32 operating on the piston areas of piston 206 and the low pressure or vacuum in atmospheric chamber 214, cause piston 206 to move upwardly, as best seen in FIG. 8C, to set packer 200 in a manner similar to that described above with reference to piston 122 and packer 80.

Figure 9:
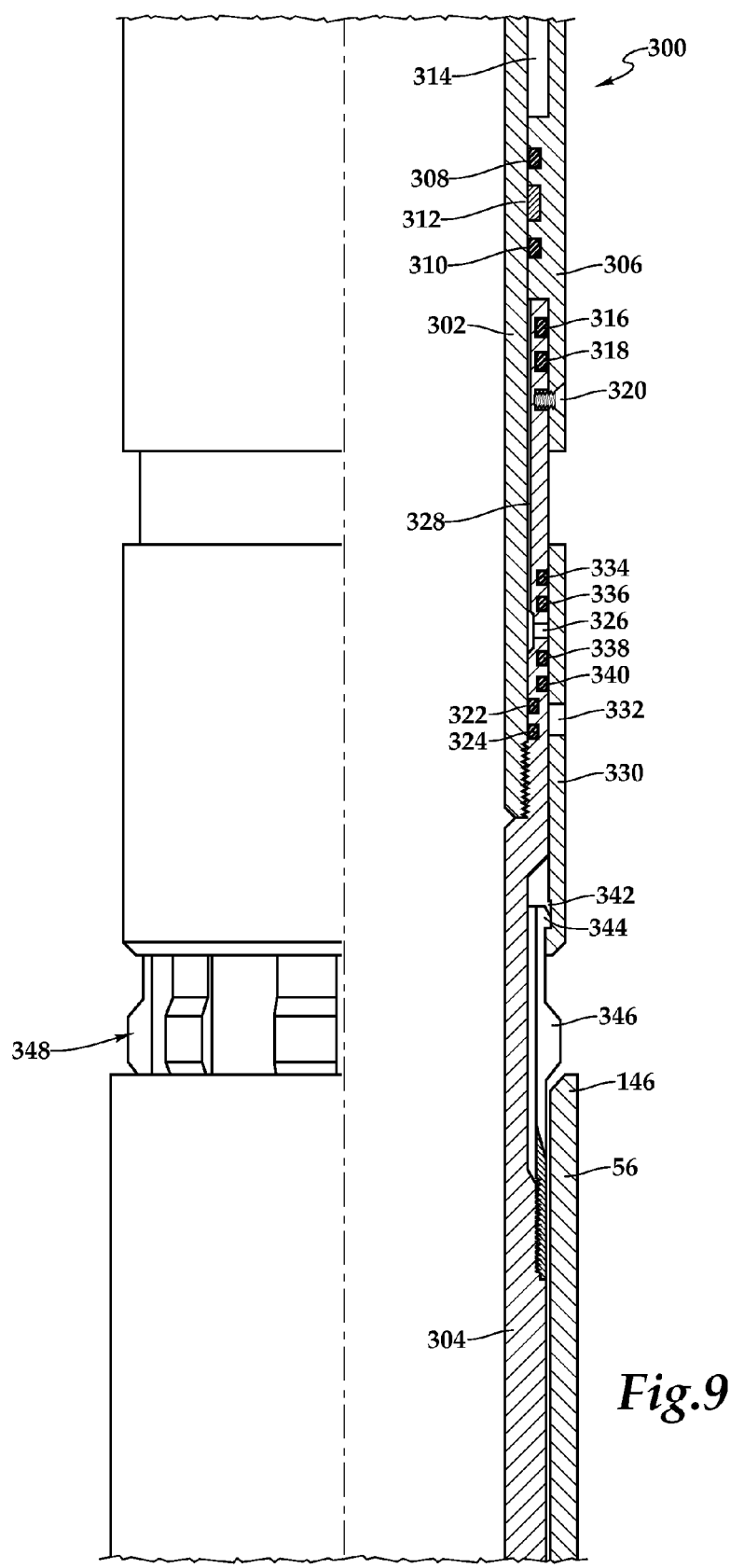
FIG. 9 is a quarter-sectional view of a release assembly of an interventionless set packer in accordance with the present invention.

Referring next to FIG. 9, therein is depicted an alternate embodiment of a release assembly for use in an interventionless set packer of the present invention that is generally designated 300. Packer 300 includes a packer mandrel 302 including packer mandrel extension 304. A piston 306 is positioned around packer mandrel 302. A pair of seals 308, 310 and a centralizer 312 are positioned between piston 306 and packer mandrel 302. Piston 306 and packer mandrel 302 define an atmospheric chamber 314 therebetween. An upper portion of packer mandrel extension 304 is position between piston 306 and packer mandrel 302. A pair of seals 316, 318 is positioned between piston 306 and packer mandrel extension 304. In the illustrated embodiment, piston 306 and packer mandrel extension 304 are secured together by one or more frangible members depicted as shear screws 320. A pair of seals 322, 324 is positioned between packer mandrel 302 and packer mandrel extension 304. Packer mandrel extension 304 includes at least one fluid port 326 that is in fluid communication with a fluid pathway 328 provided between packer mandrel 302 and packer mandrel extension 304.

A sleeve 330 is positioned around packer mandrel extension 304. Sleeve 330 includes a fluid port 332. A plurality of seals 334, 336, 338, 340 is positioned between sleeve 330 and packer mandrel extension 304. A detent 342 is formed on the inner surface of sleeve 330 near its lower end. Detent 342 is operable to releasably accept tabs 344 of collet fingers 346 of a collet assembly 348. In the illustrated embodiment, collet assembly 348, sleeve 330 and shear screws 320 can be considered to be the release assembly.

In operation, packer 300 may be run into wellbore 32 on inner work string 30 to a desired depth, as described above, and then packer 300 may be set within wellbore 32. In one embodiment, packer 300 may be used as a liner top isolation packer, such as packer 60 of FIG. 1. In particular, once liner 56 has been deployed and suspended from casing 34, packer 300 may be run into wellbore 32 using regular completion techniques.

As packer 300 enters liner top 146 of liner 56, the release assembly is actuated by engaging collet fingers 346 with liner top 146 causing them to contract inwardly towards packer mandrel 302 which retracts tabs 344 of collet fingers 346 from detent 342 of sleeve 330. Further downward movement of packer 300 causes sleeve 330 to contact liner top 146 which shifts sleeve upwardly relative to packer mandrel extension 304 aligning fluid port 332 of sleeve 330 with fluid port 326 of packer mandrel extension 304. Once fluid ports 326, 332 are aligned, wellbore pressure enters fluid pathway 328 and acts on the lower surface of piston 306. The hydrostatic pressure in wellbore 32 operating on the piston areas of piston 306 and the low pressure or vacuum in atmospheric chamber 314 cause shear screws 320 to break enabling upward movement of piston 306 which sets packer 300 in a manner similar to that described above with reference to piston 122 and packer 80.

Figure 10:
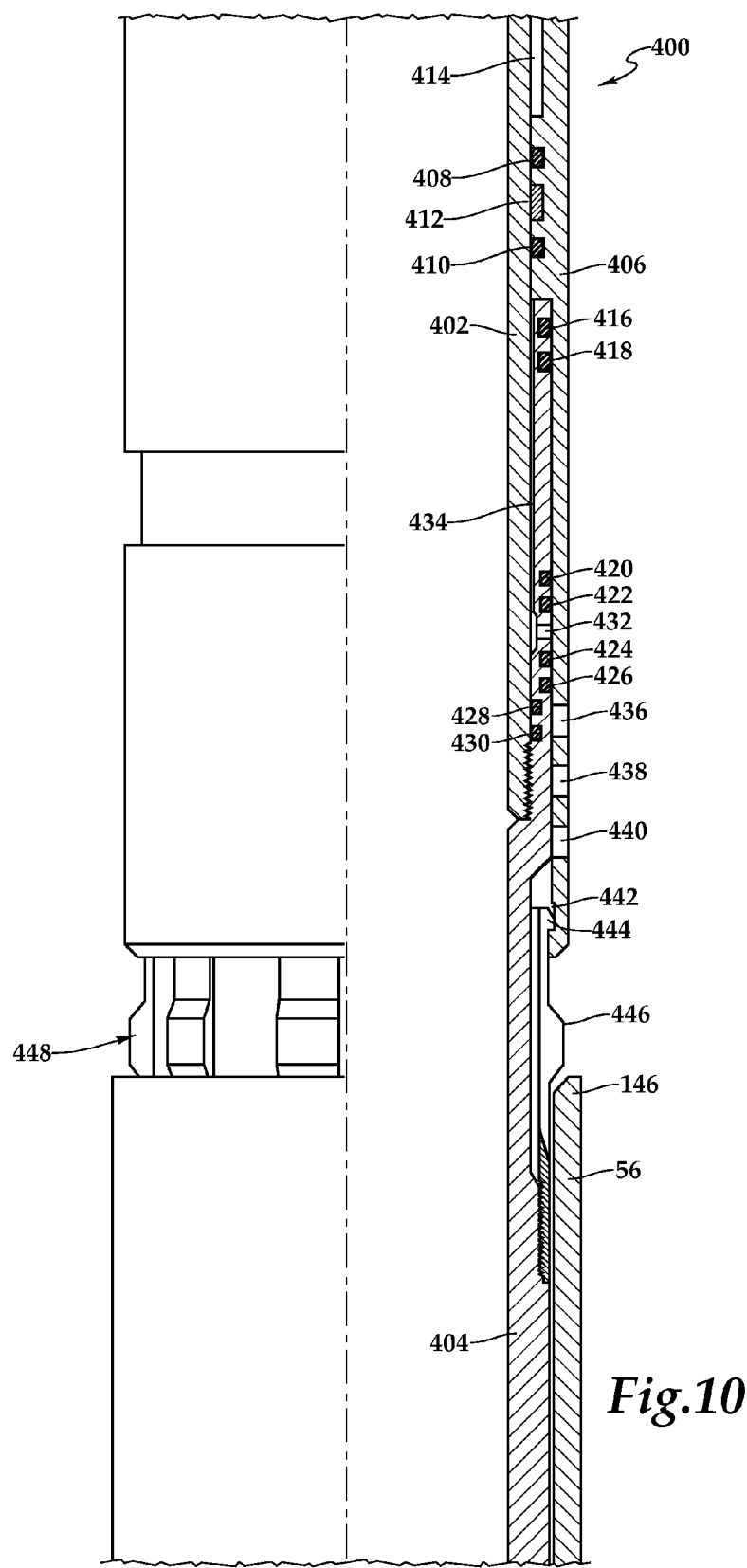
FIG. 10 is a quarter-sectional view of a release assembly of an interventionless set packer in accordance with the present invention.

Referring next to FIG. 10, therein is depicted an alternate embodiment of a release assembly for use in an interventionless set packer of the present invention that is generally designated 400. Packer 400 includes a packer mandrel 402 including packer mandrel extension 404. A piston 406 is positioned around packer mandrel 402. A pair of seals 408, 410 and a centralizer 412 are positioned between piston 406 and packer mandrel 402. Piston 406 and packer mandrel 402 define an atmospheric chamber 414 therebetween. An upper portion of packer mandrel extension 404 is position between piston 406 and packer mandrel 402. A plurality of seals 416, 418, 420, 422, 424, 426 is positioned between piston 406 and packer mandrel extension 404. A pair of seals 428, 430 is positioned between packer mandrel 402 and packer mandrel extension 404. Packer mandrel extension 404 includes at least one fluid port 432 that is in fluid communication with a fluid pathway 434 provided between packer mandrel 402 and packer mandrel extension 404.

Piston 406 includes a plurality of fluid ports 436, 438, 440. A detent 442 is formed on the inner surface of piston 406 near its lower end. Detent 442 is operable to releasably accept tabs 444 of collet fingers 446 of a collet assembly 448. In the illustrated embodiment, collet assembly 448 can be considered to be the release assembly and is designed to prevent premature upward shifting of piston 406 due to mechanical operations but not the action of the hydrostatic pressure in wellbore 32. Collet assembly 448 does not need to prevent pressure based shifting of piston 406 as the piston areas on piston 406 are designed such that, in the run in configuration, hydrostatic pressure creates a down force on piston 406.

In operation, packer 400 may be run into wellbore 32 on inner work string 30 to a desired depth, as described above, and then packer 400 may be set within wellbore 32. In one embodiment, packer 400 may be used as a liner top isolation packer, such as packer 60 of FIG. 1. In particular, once liner 56 has been deployed and suspended from casing 34, packer 400 may be run into wellbore 32 using regular completion techniques.

As packer 400 enters liner top 146 of liner 56, the release assembly is actuated by engaging collet fingers 446 with liner top 146 causing them to contract inwardly towards packer mandrel 402 which retracts tabs 444 of collet fingers 446 from detent 442 of piston 406. Further downward movement of packer 400 causes piston 406 to contact liner top 146 which shifts piston 406 upwardly relative to packer mandrel extension 404 sequentially aligning fluid port 436, 438, 440 of piston 406 with fluid port 432 of packer mandrel extension 404. While one or more of fluid ports 436, 438, 440 are aligned with fluid port 432, wellbore pressure enters fluid pathway 434 and acts on the lower surface of piston 406. The hydrostatic pressure in wellbore 32 operating on the piston areas of piston 406 and the low pressure or vacuum in atmospheric chamber 414 enabling upward movement of piston 406 which sets packer 400 in a manner similar to that described above with reference to piston 122 and packer 80.

Figure 11:
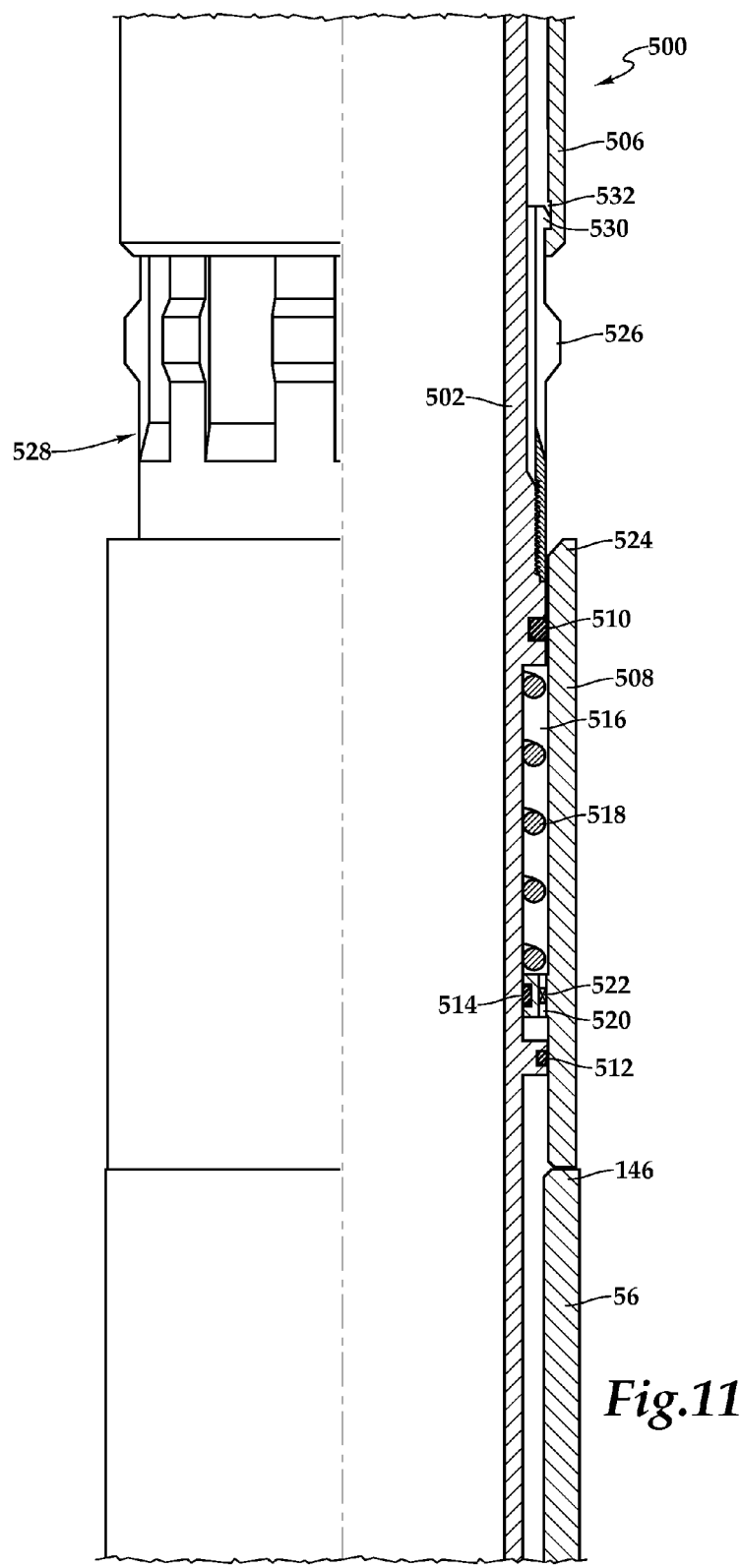
FIG. 11 is a quarter-sectional view of a time delay assembly of an interventionless set packer in accordance with the present invention.

Referring next to FIG. 11, therein is depicted a time delay assembly for use in an interventionless set packer of the present invention that is generally designated 500. Packer 500 may represent any of the packers described above and, in the illustrated section, includes a packer mandrel 502 and a piston 506 that is positioned around packer mandrel 502. A sleeve 508 is positioned around packer mandrel 502. A plurality of seals 510, 512, 514 is positioned between sleeve 508 and packer mandrel 502. Together, sleeve 508, packer mandrel 502 and seals 510, 512, 514 form a chamber 516. Disposed within chamber 516 is a biasing member depicted as a spiral wound compression spring 518. Also disposed within chamber 516 is a metering fluid such as a liquid or gas and preferably an oil such as hydraulic fluid. Sleeve 508 includes a metering section 520 that may have one or more passageways therethrough. Each passageway may include one more fluid flow control devices 522 such orifices, check valves or the like for controlling the speed and direction of fluid flow therethrough.

In operation, packer 500 may be run into wellbore 32 on inner work string 30 to a desired depth, as described above, and then packer 500 may be set within wellbore 32. In one embodiment, packer 500 may be used as a liner top isolation packer, such as packer 60 of FIG. 1. In particular, once liner 56 has been deployed and suspended from casing 34, packer 500 may be run into wellbore 32 using regular completion techniques.

As packer 500 enters liner top 146 of liner 56, the time delay assembly is operated by engaging sleeve 508 with liner top 146. This action causing spring 518 to be compressed as sleeve 518 moves upwardly relative to packer mandrel 502. Due to the resistance of the metering fluid traveling through metering section 520 of sleeve 518, the rate at which sleeve 518 moves upwardly relative to packer mandrel 502 can be controlled based upon factors such as the viscosity of the fluid and the configuration of metering section 520. Continued application of downward force on liner top 146 will result in actuation of the release assembly of packer 500 in a predetermined time period. The downward force causes upper section 524 of sleeve 508 to contact collet fingers 526 of collet assembly 528. Collet fingers 526 then contract inwardly towards packer mandrel 502 which retracts tabs 530 from detent 532 of piston 506. The hydrostatic pressure in wellbore 32 operating on the piston areas of piston 506 and the low pressure or vacuum in an atmospheric chamber (not pictured) disposed between piston 506 and packer mandrel 502 enabling upward movement of piston 506 which sets packer 500 in a manner similar to that described above with reference to piston 122 and packer 80.

In this embodiment, the actuation of the release assembly can be precisely controlled as a positive indication of packer position can be obtained prior to initiation of the setting process. Specifically, as packer 500 is lowered into wellbore 32, contact between sleeve 508 and liner top 146 is operable to provide a positive indication of the position of packer 500 at liner top 146. Due to the time delay assembly, this positive indication does not actuate the release assembly. Instead, the operator may raise the packer to take weight off sleeve 508, if desired, to perform other wellbore operation, for example. During the time period when the weight is off sleeve 508, the time delay assembly may reset, in certain embodiments, as the spring force generated by spring 518 is operable to shift sleeve 518 downwardly relative to packer mandrel 502. Thereafter, when it is desired to set packer 500, downward movement of packer 500 can reengage sleeve 508 with liner top 146 and sufficient downward force can be applied for a sufficient time period to actuation the release assembly and set packer 500.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A method for setting a packer in a wellbore, the method comprising:
    providing a packer having a packer mandrel with a seal assembly and a piston slidably disposed thereabout;
    running the packer into the wellbore;
    resisting a force acting on the piston generated by a pressure difference between pressure in the wellbore and pressure in a chamber defined between the piston and the packer mandrel by restraining movement of the piston toward the seal assembly with a release assembly;
    actuating the release assembly responsive to contact with a profile in the wellbore; and
    responsive to the pressure difference, longitudinally shifting the piston relative to the packer mandrel toward the seal assembly, to operate the seal assembly from a running position to a radially expanded sealing position, thereby setting the packer.

2. The method as recited in claim 1 wherein actuating the release assembly further comprises decoupling a collet assembly from the piston.

3. The method as recited in claim 1 wherein actuating the release assembly further comprises disengaging a split ring from the piston.

4. The method as recited in claim 1 wherein actuating the release assembly further comprises decoupling a collet assembly from a sleeve slidably disposed about the packer mandrel, shifting the sleeve toward the piston and breaking a frangible member coupling the piston and the packer mandrel.

5. The method as recited in claim 1 further comprising engaging a time delay assembly of the packer with the profile in the wellbore prior to actuating the release assembly.

6. A method for setting a packer a wellbore, the method comprising:
    providing a packer having a packer mandrel with a seal assembly, a slip assembly and a piston slidably disposed thereabout;
    running the packer into the wellbore;
    resisting a force acting on the piston generated by a pressure difference between pressure in the wellbore and pressure in a chamber defined between the piston and the packer mandrel by restraining movement of the piston toward the seal assembly with a release assembly;
    actuating the release assembly responsive to contact with a profile in the wellbore; and
    responsive to the pressure difference, longitudinally shifting the piston relative to the packer mandrel toward the seal assembly, to operate the seal assembly from a running position to a radially expanded sealing position and to operate the slip assembly from the running position to the radially expanded gripping position, thereby setting the packer.

7. The method as recited in claim 6 wherein actuating the release assembly further comprises decoupling a collet assembly from the piston.

8. The method as recited in claim 6 wherein actuating the release assembly further comprises disengaging a split ring from the piston.

9. The method as recited in claim 6 wherein actuating the release assembly further comprises decoupling a collet assembly from a sleeve slidably disposed about the packer mandrel, shifting the sleeve toward the piston and breaking a frangible member coupling the piston and the packer mandrel.

10. The method as recited in claim 6 further comprising engaging a time delay assembly of the packer with the profile in the wellbore prior to actuating the release assembly.

11. A packer for use in a wellbore having a profile, comprising:
    a packer mandrel;
    a seal assembly slidably disposed about the packer mandrel;
    a piston slidably disposed about the packer mandrel and defining a chamber therewith; and
    a release assembly disposed about the packer mandrel and releasably coupled to the piston,
    wherein, the release assembly initially restrains movement of the piston toward the seal assembly resisting a force generated by a pressure difference between pressure in the wellbore and pressure in the chamber until the release assembly is actuated responsive to contact with the profile in the wellbore, thereby allowing the pressure difference to shift the piston longitudinally relative to the packer mandrel toward the seal assembly to operate the seal assembly from a running position to a radially expanded sealing position, thereby setting the packer.

12. The packer as recited in claim 11 wherein the release assembly further comprises a collect assembly disposed about the packer mandrel.

13. The packer as recited in claim 11 wherein the release assembly further comprises a split ring disposed about the packer mandrel and at least one release key positioned at least partially between the split ring and the piston.

14. The packer as recited in 11 wherein the release assembly further comprises a collect assembly disposed about the packer mandrel, a sleeve slidably disposed about the packer mandrel and a frangible member coupling the piston and the packer mandrel.

15. The packer as recited in claim 11 further comprising a time delay assembly disposed about the packer mandrel and operable to prevent premature actuation of the release assembly.

16. A packer for use in a wellbore having a profile, comprising:
- a packer mandrel;
- a seal assembly slidably disposed about the packer mandrel;
- a slip assembly slidably disposed about the packer mandrel;
- a piston slidably disposed about the packer mandrel and defining a chamber therewith; and
- a release assembly disposed about the packer mandrel and releasably coupled to the piston,
- wherein, the release assembly initially restrains movement of the piston toward the seal assembly and the slip assembly resisting a force generated by a pressure difference between pressure in the wellbore and pressure in the chamber until the release assembly is actuated responsive to contact with the profile in the wellbore, thereby allowing the pressure difference to shift the piston longitudinally relative to the packer mandrel toward the seal assembly and the slip assembly to operate the seal assembly from a running position to a radially expanded sealing position and to operate the slip assembly from a running position to a radially expanded gripping position, thereby setting the packer.

17. The packer as recited in claim 16 wherein the release assembly further comprises a collect assembly disposed about the packer mandrel.

18. The packer as recited in claim 16 wherein the release assembly further comprises a split ring disposed about the packer mandrel and at least one release key positioned at least partially between the split ring and the piston.

19. The packer as recited in 16 wherein the release assembly further comprises a collect assembly disposed about the packer mandrel, a sleeve slidably disposed about the packer mandrel and a frangible member coupling the piston and the packer mandrel.

20. The packer as recited in claim 16 further comprising a time delay assembly disposed about the packer mandrel and operable to prevent premature actuation of the release assembly.

* * * * *